Feb. 17, 1948.    R. M. HEINTZ    2,436,212
OIL GAUGE
Filed Jan. 29, 1946
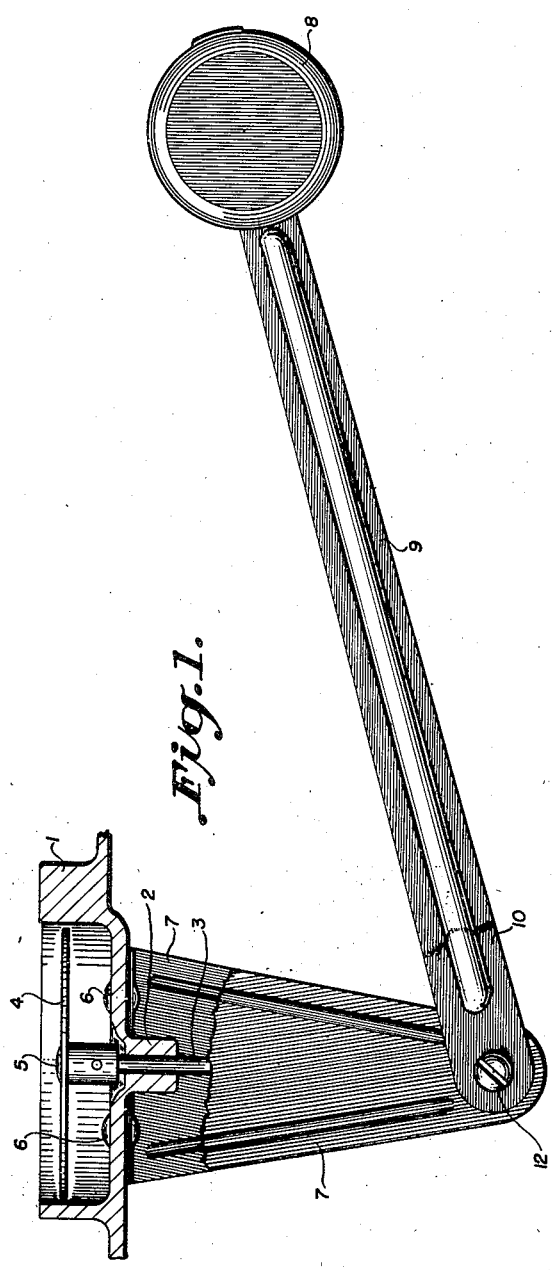
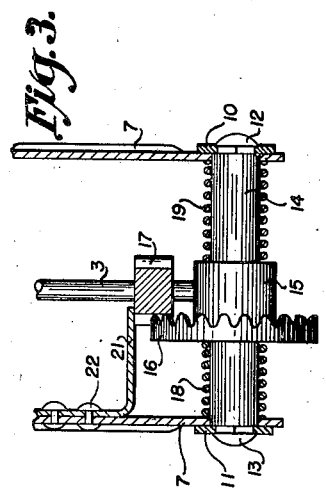
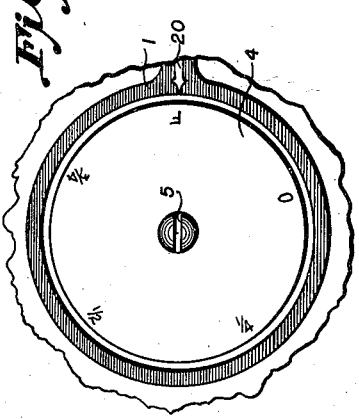
INVENTOR.
RALPH M. HEINTZ
BY
Frank H. Harmon
ATTORNEY Patented Feb. 17, 1948

2,436,212

UNITED STATES PATENT OFFICE 2,436,212

OIL GAUGE

Ralph M. Heintz, Cleveland, Ohio, assignor, by mesne assignments, to Jack & Heintz Precision Industries, Inc., Cleveland, Ohio, a corporation of Delaware Application January 29, 1946, Serial No. 643,983

2 Claims. (Cl. 73—317)

This invention relates to liquid level gauges and has for one of its primary objects to provide a simple and inexpensive float operated liquid level gauge so constructed as to be easily assembled and simply adjusted as to be usable in liquid containers of different capacities and shapes.

Another object is to provide such a float operated liquid level gauge with simple and effective means for dampening oscillations and vibrations to eliminate undesirable fluctuations of the gauge dial with respect to the stationary pointer, or vice versa.

Another object is to provide such a gauge with means to prevent the gauge dial from being splattered with liquid in the container.

With the foregoing and other objects in view, the invention resides in the combination of parts and in the details of construction hereinafter set forth in the following specification and appended claims, certain embodiments thereof being illustrated in the accompanying drawings, in which:

Figure 1 is a view in vertical section through the gauge head, body and float, the rotatable dial being shown in side elevation;

Figure 2 is a top plan view of the dial and stationary pointer;

Figure 3 is an enlarged detail view in elevation of the shafts of the float and dial with the adjustable gear drive therebetween.

Referring more particularly to the drawings, the gauge head 1 is provided with a bearing 2 to rotatably receive a vertical shaft 3 carrying a rotatable indicia bearing dial 4 releasably secured to the shaft by a screw bolt 5. Secured to the gauge head by screw bolts 6 is a body bracket 7. The float 8 is carried by an arm 9 which is forked at its opposite end to include spaced arms 10 and 11. Held rigidly by screw bolts 12 and 13 passing through fork arms 10 and 11 and body bracket 7 is a shaft 14 to hold the same between these arms. Shaft 14 carries a collar 15 that is suitably keyed to the shaft to permit sliding of the collar but prevent relative rotation. Rigid or integral with collar 15 is a gear 16 which is adapted to mesh with a gear 17 rigid with vertical shaft 3 that carries the dial 4.

On either side of the collar 15 and gear 16 and about shaft 14 are a pair of compression coil springs 18 and 19. Coil spring 18 is crowded into less distance between arm 11 and gear 16 than spring 19 between arm support 7 and collar 15 and hence overpowers spring 19 to normally force gear 16 into mesh with gear 17. Hence, movement of float arm 9 in response to variations in liquid level as the float rides thereon causes shaft 14 to rotate. Through gears 16 and 17, shaft 3 rotates to rotate dial 4 and the registry of the dial indicia with the stationary arrow index 20 on the gauge head gives an indication as to the liquid content in the container.

The two springs 18 and 19 moreover resiliently tend to stabilize the rotation of shaft 14 and damp out vibrations and oscillations that would otherwise occur and which would be undesirable if transferred to the dial to make it subject to undesired fluctuations. As a further means toward this end a spring arm 21 may be provided and secured by bolts 22 to arm 11 and resiliently rest on gear 17 to damp out undue fluctuating oscillations of shaft 3.

As long as the float arm 9 is sufficiently long to permit the float 8 to rest on the bottom of the container when the latter is empty and rest on the top of the column of liquid when the container is full, or to a desired degree, sufficient and proper rotation will be imparted to the dial to obtain a correct reading of the percentage of the container's capacity which is occupied by liquid. To be assured that the gauge will give the proper indications it is merely necessary to force gear 16 to the left, as viewed in Figure 3, against the action of spring 18. With the float resting on the bottom of the inside of the container the dial is rotated until the "0" indicia, indicating "empty," registers with the stationary arrow index 20. Then the arm 9 may be moved to the position it would assume when the tank is full and that point of the dial that registers with index 20 should be marked "F," or "full." A point on the dial midway between "0" and "F" is marked "½" and consequently a point midway between "0" and "½" is "¼" and a point between "F" and "½" is "¾," etc.

Moreover, the assembly is such that the same gauge may be used in tanks of different capacities and shapes, as long as the float arm is long enough to permit the float to engage the bottom of the tank and the top of the liquid column when the tank is filled or to a desired degree. This is true because of the simple releasability of gear 16 from gear 17 to permit free rotation of the dial for calibration, as just explained.

Another advantageous feature is the fact that the liquid content of the tank has no access to the face of the dial which might otherwise splatter the dial surface to make reading difficult. The dampening feature, provided by springs 18, 19 and 21, as previously explained, make also for stability and reliability of indications given by the gauge. The gauge, moreover, is given to ease and cheapness in manufacture, assembly and calibration for a wide range of utility in tanks of various sizes and shapes.

I claim:

1. A liquid level gauge comprising a rotatable indicating means carried by a rotatable shaft, a float and float arm pivotally movable in response to liquid level variations, said float arm having forked ends, a shaft connected to said float arm between said forked ends and rotatable by said float arm, said first shaft having a gear rigid therewith, said second shaft having a gear adjustably carried thereon and keyed against relative rotation and slidable thereon into and out of mesh with said first gear for the purpose of adjustment and calibration of said indicating means with respect to said float arm, a spring on each side of said slidable gear on said second shaft, one of which springs is stronger and adapted to overpower the other to normally resiliently force said slidable gear into mesh with the other gear.

2. A liquid level gauge comprising a rotatable indicating means carried by a rotatable shaft, a float and float arm pivotally movable in response to liquid level variations, said float arm having forked ends, a shaft connected to said float arm between said forked ends and rotatable by said float arm, said first shaft having a gear rigid therewith, said second shaft having a gear adjustably carried thereon and keyed against relative rotation and slidable thereon into and out of mesh with said first gear for the purpose of adjustment and calibration of said indicating means with respect to said float arm, a spring on each side of said slidable gear on said second shaft, one of which springs is stronger and adapted to overpower the other to normally resiliently force said slidable gear into mesh with the other gear, spring means carried by said float arm bearing against said gear rigid with said first shaft to stabilize the meshing of said two gears and dampen attending vibration.

RALPH M. HEINTZ.

REFERENCES CITED

The following references are of record in the file of this patent:

UNITED STATES PATENTS

| Number | Name | Date |
|---|---|---|
| 1,141,500 | Stahlee | June 1, 1915 |
| 1,172,481 | Oeschger | Feb. 22, 1916 |
| 1,930,546 | Bacon | Oct. 17, 1933 |

FOREIGN PATENTS

| Number | Country | Date |
|---|---|---|
| 279,191 | Great Britain | Oct. 27, 1927 |